United States Patent
Ophir et al.

(10) Patent No.: US 7,065,147 B2
(45) Date of Patent: Jun. 20, 2006

(54) SYSTEM AND METHOD OF DATA COMMUNICATION USING TURBO TRELLIS CODED MODULATION COMBINED WITH CONSTELLATION SHAPING WITH OR WITHOUT PRECODING

(75) Inventors: Lior Ophir, Herzlia (IL); Naftali Sommer, Rishon Lezion (IL); Ofir Shalvi, Herzlia (IL)

(73) Assignee: Texas Instruments Incorporated, Dallas, TX (US)

( * ) Notice: Subject to any disclaimer, the term of this patent is extended or adjusted under 35 U.S.C. 154(b) by 824 days.

(21) Appl. No.: 09/887,490

(22) Filed: Jun. 22, 2001

(65) Prior Publication Data

US 2002/0031190 A1 Mar. 14, 2002

Related U.S. Application Data

(60) Provisional application No. 60/217,767, filed on Jul. 12, 2000.

(51) Int. Cl.
*H04L 23/02* (2006.01)
*H04L 27/06* (2006.01)

(52) U.S. Cl. .................. 375/265; 375/262; 375/341
(58) Field of Classification Search ............... 375/265, 375/262, 259, 341
See application file for complete search history.

(56) References Cited

U.S. PATENT DOCUMENTS

| | | | |
|---|---|---|---|
| 5,150,381 A | * | 9/1992 | Forney et al. ............... 375/261 |
| 5,926,505 A | * | 7/1999 | Long ......................... 375/222 |
| 6,088,387 A | * | 7/2000 | Gelblum et al. ............ 375/222 |
| 6,111,912 A | * | 8/2000 | Cohen et al. ............... 375/225 |

OTHER PUBLICATIONS

A.K.Khandani, "Shaping of Multi-dimensional Signal constellations Using a Lookup Table", IEEE 1992, p. 0927-0931.*
Rajiv Laroia, "Coding for Intersymbol Interference Channels—Combined coding and Precoding", Jul. 1996, IEEE,p. 1053-1061.*
U.S. Appl. No. 09/900,395.
"Multilevel Codes: Theoretical Concepts and Practical Design Rules", IEEE Transactions on Information Theory, vol. 45, No. 5, Jul. 1999, pp. 1361-1391, XP002187530, New York, US, Section VIII, (Udo Wachsmann, Robert F.H. Fischer and Johannes B, Huber).
"The Art of Signaling: Fifty Years of Coding Theory", IEEE Transactions of Information Theory, vol. 44, No. 6, Jun. 1998; pp. 2561-2595, XP002187531, Sections I,G,I.H and I.J, (A. R. Calderbank).

(Continued)

Primary Examiner—Jay K. Patel
Assistant Examiner—Sam K. Ahn
(74) Attorney, Agent, or Firm—Abdul Zindani; W. James Brady, III; Frederick J. Telecky, Jr.

(57) ABSTRACT

A technique that combines a turbo trellis coded modulation (TTCM) coding scheme with constellation shaping and precoding schemes to implement a binary coded communication system and method that can achieve high performance (high coding gains achieved in combination with shaping gain, and when necessary, also with high performance in ISI-channels via preceding).

30 Claims, 6 Drawing Sheets

OTHER PUBLICATIONS

"Multilevel Coding: Aspects from Information Theory", IEEE Global Telecommunications Conference, Nov. 18, 1996-Nov. 22, 2996, pp. 26-30, XP010219990, New York, US; Section 4, (Robert F.H. Fischer, Johannes B. Huber and Udo Wachsmann).

"Applications of Error-Control Coding", IEEE Transactions on Information Theory, vol. 44, Oct. 1998, pp. 2531-2560, XP002187532, New York, US, ISSN: 0018-9448, Abstract, (Daniel J. Costello, Jr., Joachim Hagenauer, Hideki Imai, and Stephen B. Wicker).

"Trellis Precoding: Combined Coding, Precoding and Shaping for Intersymbol Interference Channels", IEEE Transactions on Information Theory, vol. 38, No. 2, Mar. 1992, pp. 301-314, XP000257684, New York, US, Abstract, (M. Vedat Eyuboglu and G. David Forney, Jr.).

"Two Approaches to Multilevel QAM Coding", IEEE International Symposium on Information Theory, Aug. 16-21, 1998, p. 208, XP010296850, New York, US, The Whole Document, (Anand R. Oka, Shraga Bross and Shlomo Shamai(Shitz)).

"Turbo Codes with Non-Uniform Constellations", IEEE International Conference on Communications, Jun. 11-14, 2001, pp. 70-73, XP002187533, Piscataway, USA, IEEE, US, p. 70, left-hand column, paragraph 2, (Christine Fragouli, Richard D. Wesel, D. Sommer and G.P. Fettweis).

"The Effect of a Precoder on Serially Concatenated Coding Systems with an ISI Channel", IEEE Transactions on Communications, vol. 49, No. 7, Jul. 2001, pp. 1168-1175, XP002187534, New York, US, ISSN: 0090-6778, Abstract, (Inkyu Lee).

"Precoding for Block Signalling and Shaped Signal Sets", IEEE International Conference on Communications, Jun. 11-14, 1989, pp. 1086-1090, vol. 2, XP000075283, 1989, New York, NY, USA, IEEE, USA, Abstract, (S. Kasturia and J.M. Cioffi).

"A Simple and Effective Precoding Scheme for Noise Whitening on Intersymbol Interference Channels", IEEE Transactions on Communications, vol. 41, No. 10, Oct. 1993, pp. 1460-1463, XP000398022, New York, US, Abstract, (Rajiv Laroia, Steven A. Tretter and Nariman Farvardin).

* cited by examiner

SYSTEM AND METHOD OF DATA COMMUNICATION USING TURBO TRELLIS CODED MODULATION COMBINED WITH CONSTELLATION SHAPING WITH OR WITHOUT PRECODING

RELATED PATENT APPLICATIONS

This application claims the benefit, under 35 U.S.C. §119(e)(1), of U.S. Provisional Application Serial No. 60/217,767, entitled Method And System Of Data Communication Using Constellation Shaping, Precoding And Coding, filed Jul. 12, 2000 by Lior Ophir.

BACKGROUND OF THE INVENTION

1. Field of the Invention

This invention relates generally to constellation shaping, precoding and coding, and more particularly to a method and system of combining turbo trellis coded modulation (Turbo-TCM/TTCM) with constellation shaping with/without preceding.

2. Description of the Prior Art

Constellation shaping is a means for selecting the stream of transmitted symbols in a communication system, according to a criterion of minimum average power under the constraint of a given minimum distance between neighboring points. By doing that, the constituent two-dimensional constellation is "shaped" into a certain form (with a certain probability distribution between the constellation points). Thus, a symbol sequence with a lower average power can be used (or alternatively a sequence with a high inter-symbol distance between neighboring points for a given power constraint). This results in "shaping gain" which may cause the communication system to become more robust to noise and channel impairments, or result in higher achievable data rates.

Two known methods of constellation shaping are trellis shaping and shell mapping. On Gaussian channels with intersymbol interference (ISI), it is often desired to use preceding methods to mitigate channel distortion. Tomlinson-Harashima (TH) precoding is a well known precoding scheme for ISI-channels.

When constellation shaping is used in ISI channels, it is desired to use a combination of shaping and precoding. A method of combining trellis shaping with TH-precoding is called trellis precoding. Combining shell mapping with preceding can be done by incorporating Laroia precoding. It is known in the art that lattice codes can also be combined with trellis shaping and trellis precoding. Thus, trellis coded modulation (TTCM) schemes can be combined with shaping and preceding to achieve coding gain together with shaping gain, and to have high performance, even in ISI-channels.

Lattice codes (e.g. TTCM) can also be combined with shell mapping and Laroia preceding to achieve coding gain together with shaping gain, and to have high performance, even in ISI-channels. This is done for example, in the ITU V.34 standard for voice grade modems.

Recently, a new coding technique, "turbo coding" was introduced, which can be used to achieve higher coding gains than other coding schemes; and when used in communication systems, may result in better robustness to noise and other impairments, or in higher (closer to capacity) data rates. Whereas the original work in the field of turbo coding addresses the case of binary transmission, new schemes have recently been developed for incorporating turbo coding when using larger constellations. These schemes are referred to as Turbo trellis coded modulation (TTCM).

In view of the foregoing, a need exists for a technique that combines a TTCM coding scheme with shaping and preceding schemes to implement a system and method that can achieve better performance (higher coding gains achieved in combination with shaping gain, and when necessary, also with high performance in ISI-channels via precoding) than existing methods and systems.

SUMMARY OF THE INVENTION

The present invention is directed to a technique that combines a turbo trellis coded modulation (TTCM) coding scheme with constellation shaping and preceding schemes to implement a binary coded communication system and method that can achieve high performance (high coding gains achieved in combination with shaping gain, and when necessary, also with high performance in ISI-channels via preceding).

According to one embodiment, a method of binary coded data communication comprises the steps of:

providing a transmitter having a turbo trellis coded modulator (TTCM) encoder and constellation shaping elements; and generating a plurality of signal points in response to a partitioned binary coded symbol sequence that is processed via the TTCM encoder and constellation shaping elements.

According to another embodiment, a binary coded data communication system comprises:

a transmitter having a turbo trellis coded modulator (TTCM) encoder and constellation shaping elements; and a receiver having a turbo decoder and constellation shaping elements, wherein the transmitter is operational to generate a plurality of signal points in response to a partitioned symbol sequence that is processed via the TTCM encoder and constellation shaping elements, and further wherein the receiver is operational to receive the plurality of signal points over a transmission medium and recover the partitioned symbol sequence in response to the plurality of signal points that are received and processed via the receiver turbo decoder and the receiver constellation shaping elements.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The present inventor recognized that although constellation shaping and precoding have been implemented in the past and also combined with TTCM, it has never before been combined with Turbo-TTCM. This combination of TTCM, constellation shaping and precoding is believed by the present inventor to be better than the use of TTCM alone since it is believed to provide additional shaping gain, in addition to the coding gain achieved by the TTCM. It is also believed to be better than conventional TTCM combined with shaping with or without precoding since TTCM achieves better coding gain than TTCM; thus the overall gain is higher, and better performance (e.g. data rates or robustness) can be achieved.

Figure 1:
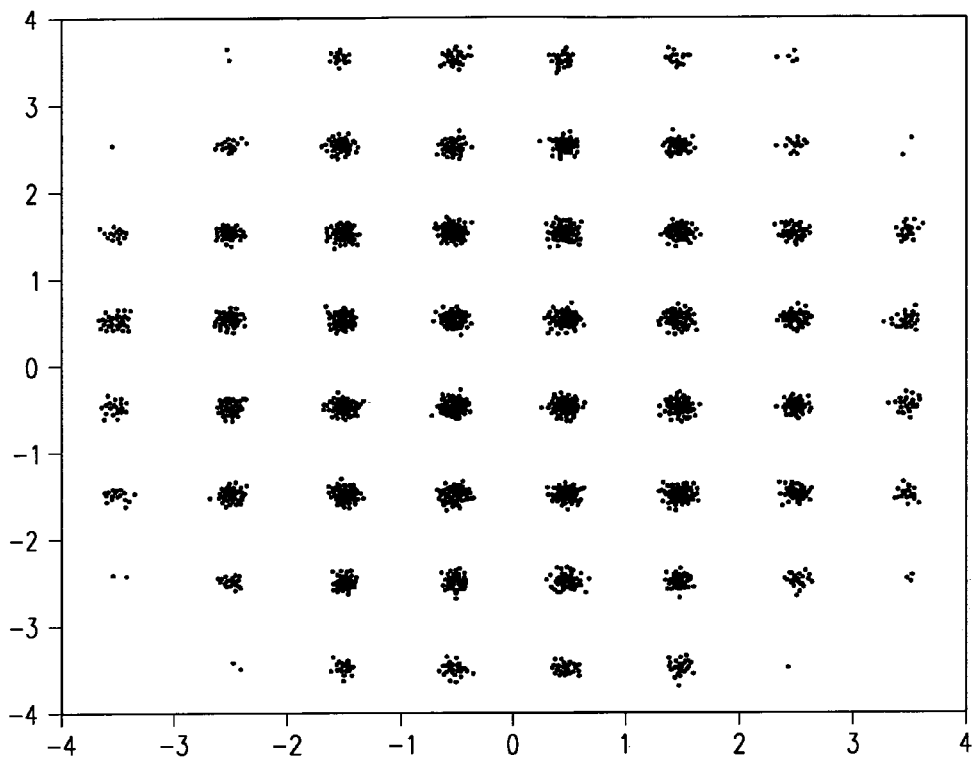
FIG. 1 illustrates simulation results for a shaped constellation using trellis shaping compatible with TTCM when using R=5 information bits per 2D symbol.

For channels with ISI, it is sometimes desirable to use precoding to mitigate channel impairments. Such precoding can be implemented in the present method, as discussed herein below. The present inventor has found shaping and precoding results for cases suitable for use with TTCM, using codes of rate 1/2 and rate 2/3. Particular embodiments presented herein below combine TTCM with shaping, and with/without precoding, subject to the following conditions: 1) Known TTCM coding schemes may be used; and the embodiments presented herein below deal with TTCMs of rate 1/2 and of rate 2/3 resulting in dividing the 2D constellation into 4 or 8 cosets respectively; 2) Known constellation shaping methods that may be used are trellis shaping or shell mapping; and 3) Precoding may also be used together with the shaping and Turbo-TTCM system. FIG. 1 illustrates simulation results for a shaped constellation using trellis shaping compatible with TTCM when using R=5 information bits per 2D symbol.

Figure 2:
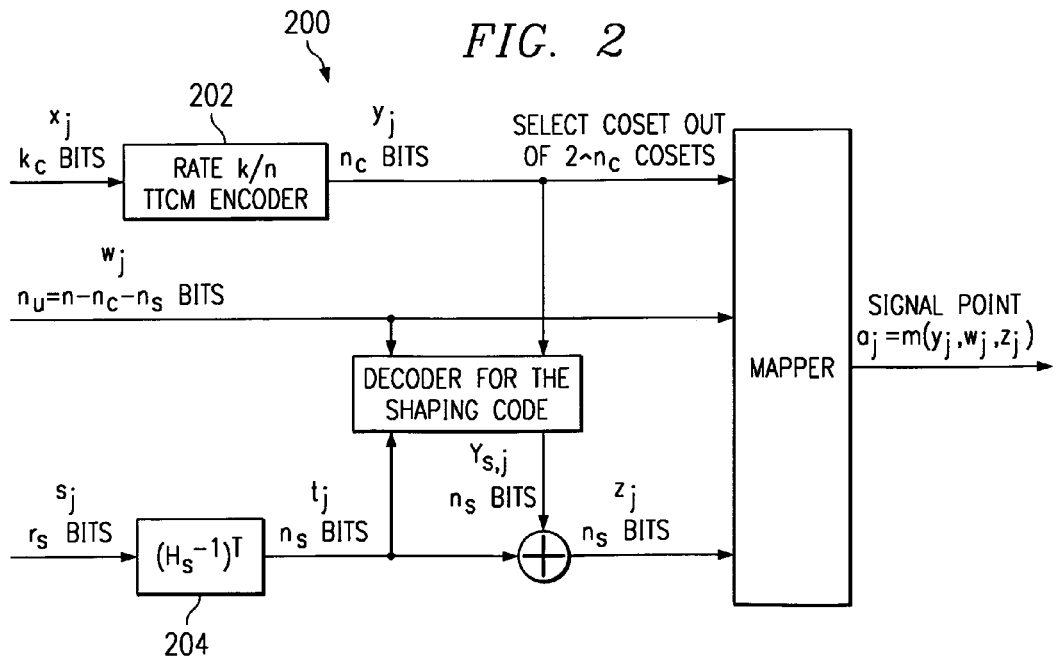
FIG. 2 is a simplified block diagram illustrating a transmitter using TTCM combined with trellis shaping according to one embodiment of the present invention.

FIG. 2 is a simplified block diagram illustrating a transmitter 200 using TTCM combined with trellis shaping according to one embodiment of the present invention. The input sequence can be seen to be divided into three parts ($x_J$, $w_J$, $s_J$). The first part is a binary $k_c$-tuple, and is an input to a TTCM encoder 202 for a rate $k_c/n_c$ TTCM code. The middle part is an uncoded binary $n_u$-tuple. The last part, a syndrome $r_s$-tuple, is an input to an $r_s$ input, $n_s$ output coset representative generator $(H_s^{-1})^T$ 204 for a rate $k_s/n_s$ convolutional shaping code, where $k_s = n_s - r_s$. The procedure used is then as disclosed in section III(A) of Trellis shaping, G. D. Forney, IEEE Trans. Inf., Vol. 38, March 1992, which is incorporated by reference herein, but implemented instead with the channel code being TTCM.

Figure 3:
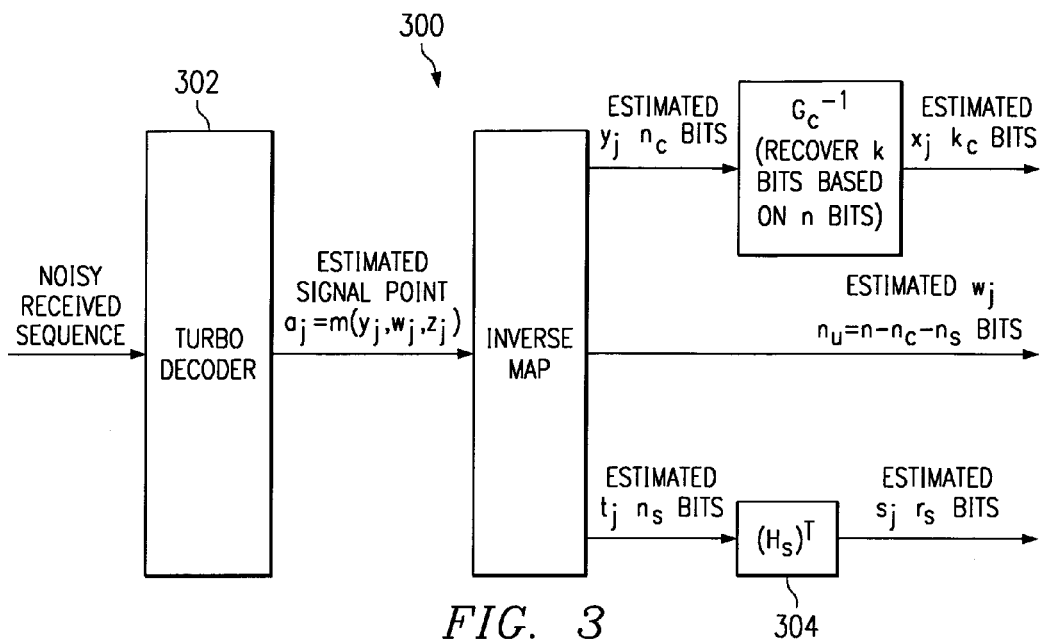
FIG. 3 is a simplified block diagram illustrating a receiver using TTCM combined with trellis shaping according to one embodiment of the present invention.

FIG. 3 is a simplified block diagram illustrating a receiver 300 using TTCM combined with trellis shaping according to one embodiment of the present invention. In similar fashion, the procedure used in association with receiver 300 follows that disclosed in section III(C) of Trellis shaping, G. D. Forney, IEEE Trans. Inf., Vol. 38, March 1992, incorporated by reference herein, but with the channel code decoder 302 being a TTCM decoder such as that disclosed in Bandwidth efficient Turbo Trellis-coded Modulation using Punctured component codes, P. Robertson, T. Woerz, IEEE Journal on selected areas of comm., February 1998, also incorporated by reference herein.

A method of using the trellis shaping is now set forth herein below with considerations for selecting the shaping regions for compatibility with the TTCM. In trellis shaping such as disclosed in Trellis shaping, G. D. Forney, IEEE Trans. Inf., Vol. 38, March 1992, incorporated by reference herein, one uses a "shaping code" ($C_s$ of rate $k_s/n_s$) and then uses the redundancy (resulting in constellation expansion) to select such a code sequence that minimizes the overall power of the transmitted sequence. This is done by implementing a decoder for the code $C_s$ (e.g. Viterbi algorithm (VA)) in the transmitter. The constellation is divided into $2^{n_s}$ "shaping regions", each having the same number of points (when coding based on set-partitioning is used also, each region must have the same number of points from every coding subset). All input bits enter the decoder that selects the signal sequence (i.e. the shaping region sequence) which results in minimum energy (other criteria may be easily implemented by replacing the metric calculation in the VA).

The receiver requires reconstruction of the $r_s = n_s - k_s$ information bits per symbol that enter the shaping coder. This is done with a syndrome former for the code $C_s$ (i.e. passing the sequence through a $n_s \times n_s - k_s$ transfer function matrix $H^T$) as stated herein before. As also stated above, trellis shaping can be easily implemented together with TTCM by using appropriate shaping regions. Issues that should be considered are now discussed with reference to a 4-state rate-1/2 convolutional shaping code which has been tested by the present inventor.

Trellis shaping was simulated using different constellations and shaping regions with the results shown in Table I below. These results are provided for schemes compatible with rate-1/2 and rate-2/3 codes where * indicates square region shaping was not checked, but is expected to give similar results as that provided by spherical region shaping.

TABLE I

| Date rate R Information Bits/symbol | Constellation without → with shaping | Theoretical shaping gain [dB] | Actual Shaping gain [dB] | Shaping Regions used **** | Remarks |
|---|---|---|---|---|---|
| 2 | 4PSK → 8QAM | 1.25 | 0 | Spherical | No coding |
| 3 | 8QAM → 16QAM | 1.03 | 1.54 | Square/ Spherical | Compatible with rate-1/2 code |
| 4 | 16QAM → 32CR | 0.96 | 0.68 | Spherical | Compatible with rate-1/2 code |
| 5 | 32CR → 64QAM | 0.97/0.95 | 0.69/0.67 | Square/ Spherical | Compatible with rate-1/2 code |
| 6 | 64QAM → 128QAM | 0.96 | 0.89 (0.79)*** | Spherical ** | Compatible with rate-1/2 code |
| 7 | 128QAM → 256QAM | 0.97 | 0.79 | Square/ Spherical | Compatible with rate-1/2 code |
| 8 | 256QAM → 512QAM | 0.96 | 0.95 (0.76)*** | Spherical ** | Compatible with rate-1/2 code |
| 4 | 16QAM → 32CR | 0.85 | 0.57 | Spherical | Compatible with rate-2/3 code |
| 5 | 32CR → 64QAM | */0.90 | */0.62 | Square/ Spherical | Compatible with rate-2/3 code |
| 6 | 64QAM → 128QAM | 0.96 | 0.89 (0.79)*** | Spherical ** | Compatible with rate-2/3 code |
| 7 | 128QAM → 256QAM | */0.97 | */0.78 | Square/ Spherical | Compatible with rate-2/3 code |
| 8 | 256QAM → 512QAM | 0.97 | 0.95 (0.77)*** | Spherical ** | Compatible with rate-2/3 code |

Figure 12:
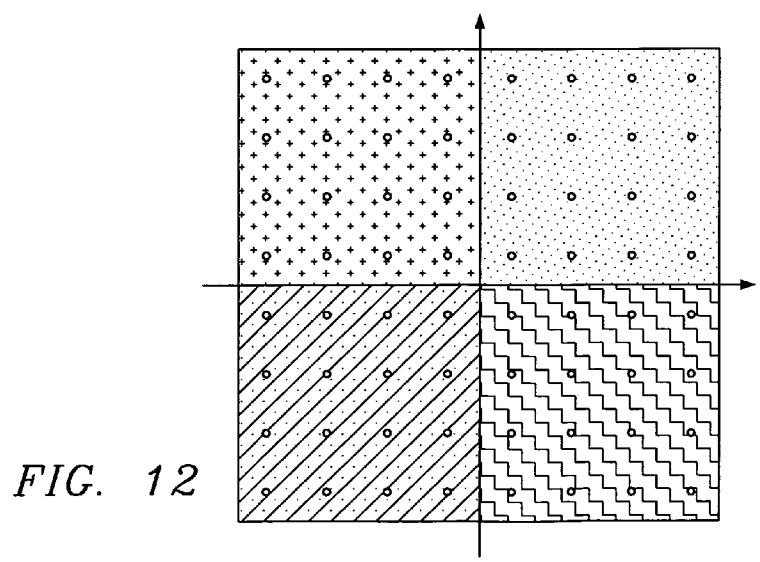
FIG. 12 illustrates a 64 QAM constellation with square shaping regions, designed for trellis shaping and that is compatible with rate-1/2 code.
Figure 13:
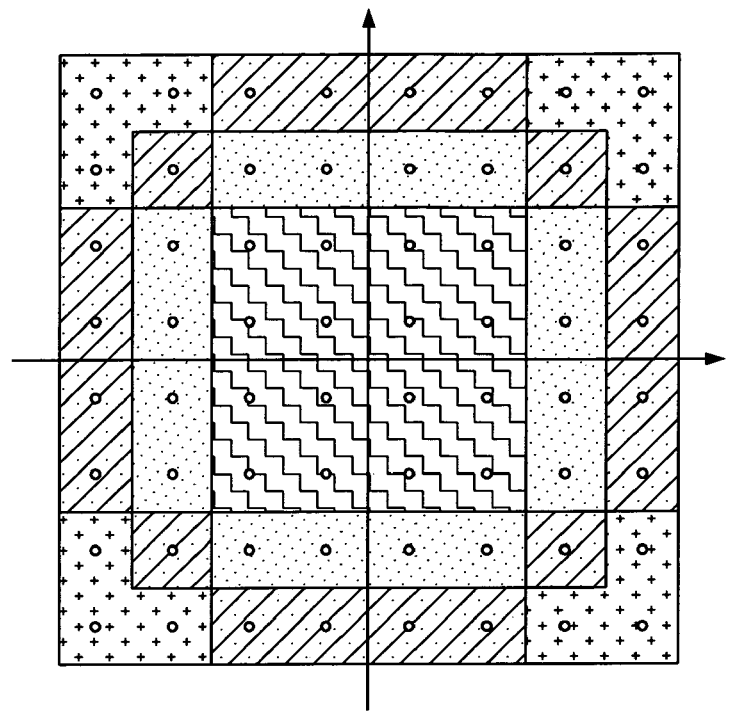
FIG. 13 illustrates a 64 QAM constellation with spherical shaping regions, designed for trellis shaping and that is compatible with rate-1/2 code.

The double  shown in Table I indicates that for non-square constellations, it should be determined whether a scheme similar to square region shaping is possible, since this may be important for combination with TH-precoding. The triple * indicates that actual shaping gain was calculated relative to a square constellation. This was calculated in accordance with $$\gamma_s = S_x \oplus (R)/S_x = 2^R/6S_x \qquad (1)$$

where $\gamma_s$ is defined as the ratio between the average energy per two dimensions of the transmitted sequence and the baseline average energy, that of a conventional square QAM constellation supporting the same data rate per two dimensions. Using a trivial 2D "constellation shaping" (i.e., using a circle constellation rather than a square) yields the relative shaping gain in shown parenthesis. The quad **** indicates that constellations with square shaping regions, and spherical shaping regions, designed for trellis shaping and that are compatible with rate-1/2 code are illustrated in FIGS. 12 and 13 respectively. As can be seen in the simulation results shown in Table I, a shaping gain of almost 1 dB may be achieved by using a 4-state rate-1/2 convolutional shaping code. Further, the shaping gain is achieved only with sufficient decoding delay in the decoder. Regarding the 4-state rate-1/2 code, a delay of 20 symbols was found to be sufficient. The results shown in Table I also indicate the shaping scheme depends on the shaping regions and on the constellation size. FIG. 1 illustrates simulation results for a shaped constellation using trellis shaping compatible with TTCM when using R=5 information bits per 2D symbol.

The complexity of trellis shaping lies primarily in the transmitter (e.g. 200 in FIG. 2), whereas the receiver (e.g. 300 in FIG. 3) is kept simple. Shaping also requires expanding the constituent 2D constellation by a factor of two.

The complexity of the transmitter involves implementing a (4-state) VA which requires eight metric calculations per symbol iteration (each metric calculation requires bits to symbol mapping and energy computation). The VA must be implemented in such a way that will result in a legitimate shaping code sequence, since other implementations will not work. Reducing complexity of the decoder (i.e. by using estimated symbol power rather than accurate symbol power in the branch metric) might result in degradation in the shaping gain, but will not harm the receiver. The information shaping bits ($r_s$ per symbol) in the transmitter 200 also pass through a $n_s - k_s \times n_s = 1 \times 2$ transfer function matrix $(H^{-1})^T$, enumerated 204 in FIG. 2. One element of $(H^{-1})^T$ may be zero when implementing the present method of combining TTCM and constellation shaping. The information shaping bits in the receiver 300 are reconstructed by passing through a $n_{s \times n} s - k_s = 2 \times 1$ transfer function matrix $H^T$, enumerated 304 in FIG. 3.

Peak-to-average (PAR) constraints can be employed in the VA such that certain (high power) constellation points will yield an infinite metric and will never appear. When using spherical shaping regions, for example, all points in the outer region can be assigned infinite metrics (practically this means deleting these branches from the trellis). Prior art simulation results have shown that the shaping gain is reduced by only a few hundredths of a dB when employing such PAR constraints. In view of the foregoing, it can be seen that choosing appropriate shaping regions may have a substantial influence on the shaping gain.

Since a FIR is implemented in the receiver 300 to reconstruct the shaping information bits, caution most preferably should be taken as to the initial state of the trellis (or the first few bits may be incorrect). Starting from a predefined state will result in no noticeable degradation in performance.

Other shaping codes may also be implemented to achieve a higher shaping gain, but the 4-state rate-1/2 code that is used in *Trellis shaping*, G. D. Forney, IEEE Trans. Inf., Vol. 38, March 1992, incorporated by reference herein, was found by the present inventor to provide the best performance/complexity tradeoff. It will readily be appreciated that the present invention is not so limited however, and that multi-dimensional shaping schemes may also be implemented.

In summary explanation, trellis shaping may achieve a shaping gain of almost 1 dB in addition to other schemes, and may run smoothly together with them, using a simple 4-state code. Since most of the complexity is centered in the transmitter, it is an especially appropriate method for broadcast systems. Caution must be taken as to choosing the appropriate shaping regions for the scheme employed (constellation, code, etc.). No severe error propagation is induced by the receiver when implementing trellis shaping.

Figure 4:
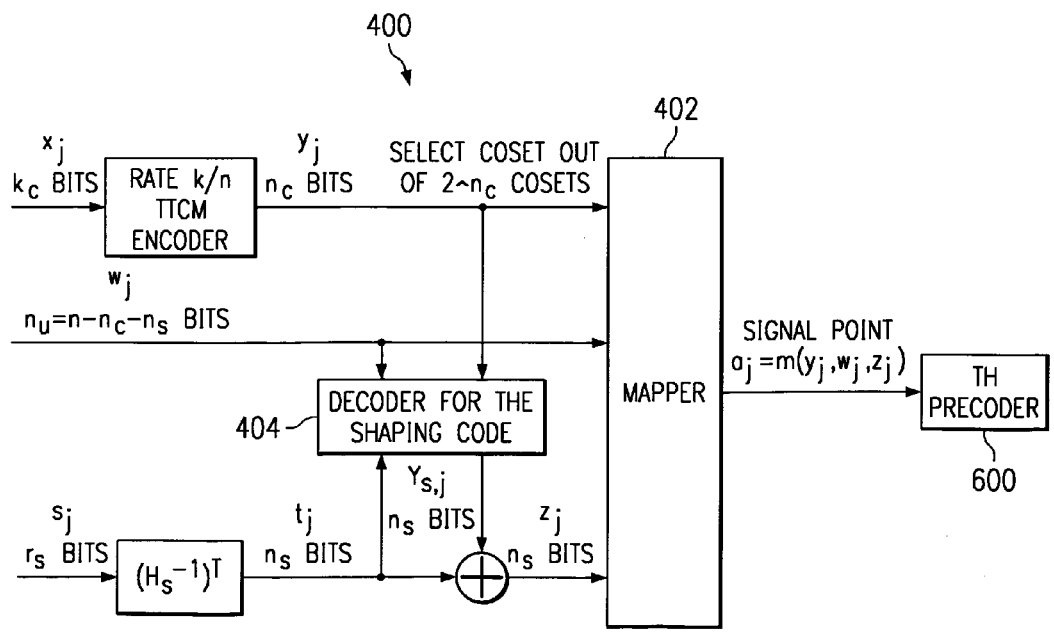
FIG. 4 is a simplified block diagram illustrating a transmitter using TTCM combined with trellis precoding according to one embodiment of the present invention.

FIG. 4 is a simplified block diagram illustrating a transmitter 400 using TTCM combined with trellis precoding according to one embodiment of the present invention.

Figure 5:
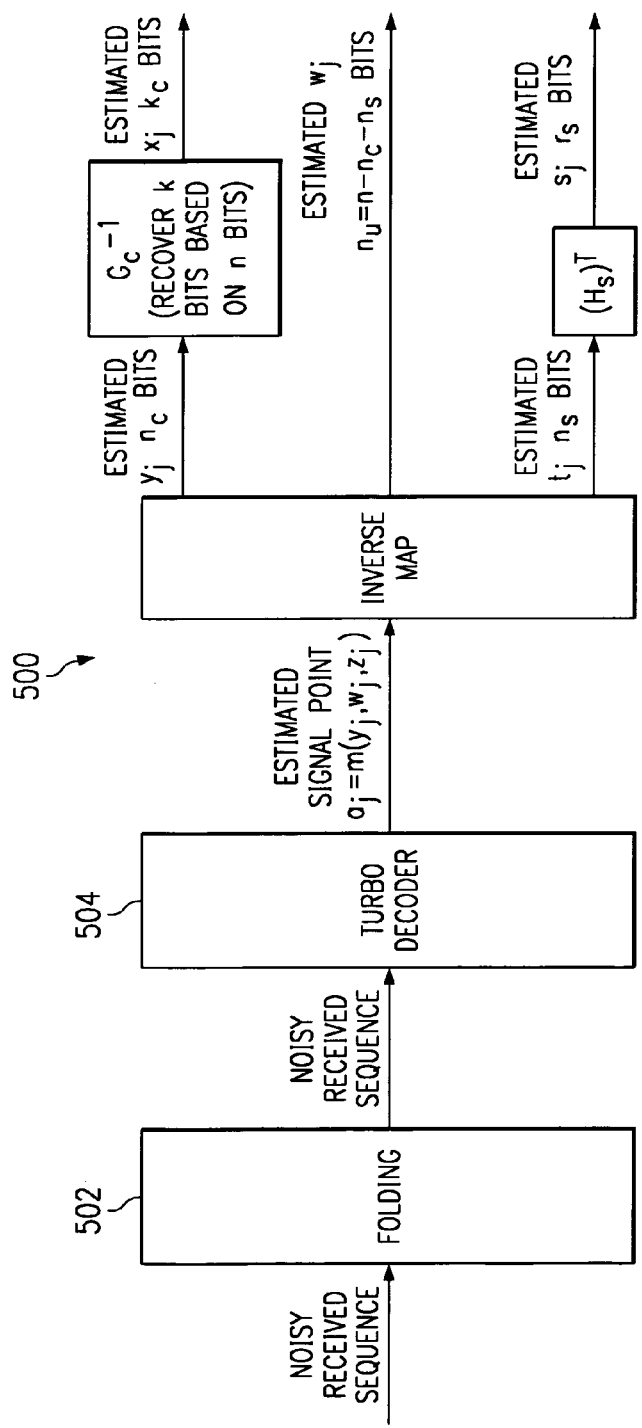
FIG. 5 is a simplified block diagram illustrating a receiver using TTCM combined with trellis preceding according to one embodiment of the present invention.

FIG. 5 is a simplified block diagram illustrating a receiver 500 using TTCM combined with trellis precoding according to one embodiment of the present invention.

trellis has an infinite number of states due to the modulus operation within the TH precoder 600; but implementing a reduced complexity PDFD (parallel decision-feedback decoder) having the same number of states as the decoder for trellis shaping usually results in a small degradation in performance (although this may depend on the specific channel and precoder employed). The receiver 500 is similar to the one for trellis shaping combined with TTCM, shown in FIG. 3; only modulus operation is most preferably implemented (or using an infinite grid in the slicer) due to the TH precoding scheme. The present inventor performed trellis preceding combined with TTCM simulations using different constellations and shaping regions for two channels: $H_1=[1\ -0.2\ 0.1]$ and $H_1=[1\ 0.4\ -0.2]$. The simulation results are set forth below in Table 2.

TABLE 2

| Date rate R Information bits/symbol | Constellation without → with shaping | Theoretical and actual shaping gain [dB]* | Shaping gain over non precoded system [dB] | Shaping Regions used | Remarks |
|---|---|---|---|---|---|
| 3 | 8QAM → 16QAM | (0.75/0.59)/ (0.77/0.58) | (0.47/0.31)/ (0.49/0/30) | Square/ Spherical | Compatible with rate-1/2 code |
| 5 | 32CR → 64QAM | (0.88/0.70)/ (0.89/0.69) | (0.60/0.42)/ (0.61/0.41) | Square/ Spherical | Compatible with rate-1/2 code |
| 7 | 128QAM → 256QAM | (0.93/0.74)/ (0.93/0.73) | (0.74/0.54)/ (0.74/0.53) | Square/ Spherical | Compatible with rate-1/2 code |
| 5 | 32CR → 64QAM | (/)/ (0.86/0.71) | (/)/ (0.58/0.43) | Square/ Spherical | Compatible with rate-2/3 code |
| 7 | 128QAM → 256QAM | (/)/ (0.92/0.74) | (/)/ (0.73/0.54) | Square/ Spherical | Compatible with rate-2/3 code |

Figure 6:
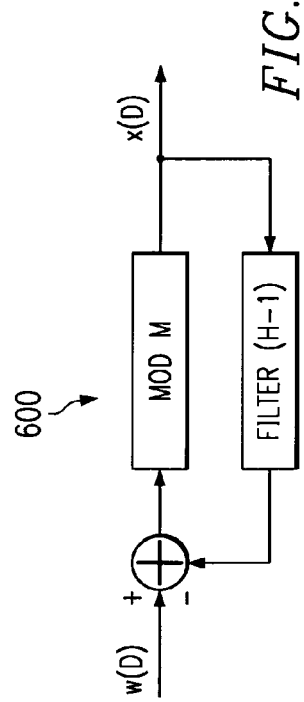
FIG. 6 is a simplified block diagram illustrating TH-precoding.

FIG. 6 is a simplified block diagram illustrating one embodiment of a TH-precoder 600.

The method of combining trellis precoding with TTCM is similar to that described herein before for combining trellis shaping with TTCM, except that now, precoding via TH precoder 600 is performed on the output symbols of the mapper 402. The decoder 404 for the shaping code uses the output of the TH precoder 600 in order to select the desired bit sequence $y_{s,j}$ and the transmitted symbol sequence. A folding step 502 is required in the receiver 500 to reconstruct the symbols at the precoder 600 input (symbol sequence w), based on the product of the turbo decoder 504 (which recovers the symbol sequence w up to a modulo operation). It can be readily appreciated that some enhancements easily implemented by those skilled in the art might be needed in the TTCM decoder 504 to support this larger ("folded") constellation. Once the symbols at the precoder 600 input are recovered, mechanisms similar to those described herein before regarding combining trellis shaping with TTCM can be used to recover the original transmitted bits. Methods for using trellis precoding with TTCM, as well as some novel schemes for using TH preceding with non-square constellations are now set forth herein below.

Trellis precoding, as stated herein before, means implementing trellis shaping together with Tomlinson-Harashima (TH) precoding. FIG. 4 illustrates a block diagram of a transmitter 400 that employs a TH precoder 600. The transmitter 400 resembles the one for trellis shaping combined with TTCM, depicted in FIG. 2; only now branch metrics are calculated according to the precoded symbols. This means implementing a separate precoder for each state in the trellis of the VA in the transmitter 400. Generally, the The single * indicates that shaping gain is given for both channels tested, in the form [square regions: (shaping gain for H1)/(shaping gain for H2)/(spherical regions: (shaping gain for H1)/(shaping gain for H2)]. The double ** indicates that square region shaping was not checked, but is expected to provide similar results to that provided with spherical region shaping. It can be seen from the simulation results shown in Table 2 that using trellis preceding results in a slight degradation in performance in comparison to the no preceding case. This degradation is channel (and hence precoder) dependent due to the use of the PDFD. Using more sophisticated decoders will result in achieving shaping gains similar to the no precoding case. Still, a shaping gain of almost 1 dB may be achieved by using a 4-state rate-1/2 convolutional shaping code as in *Trellis shaping*, G. D. Forney, IEEE Trans. Inf., Vol. 38, March 1992, incorporated by reference herein. It can be appreciated that other issues such as shaping regions, decoder delay, and the like discussed herein before also apply for trellis precoding.

The complexity of trellis precoding is higher than that of trellis shaping due to the implementation of precoding for each state in the VA as stated herein before. For long precoders, the complexity may be reduced by using only a few (large valued) taps within the VA. This might result in a slight degradation in shaping gain. The PDFD used in the simulation is 4-state, equivalent to the one used for the no preceding case discussed herein before with reference to Table I. Those skilled in the art will readily appreciate that more complex decoders (such as 8 or 16-state) may result in better performance, especially for "difficult channels." As in the non-precoder case, the receiver 500 is kept simple, and the only difference is the use of modulus arithmetic, or the use of an infinite grid in the slicer. It can also be appreciated that other issues discussed above regarding trellis shaping are applicable to trellis preceding.

Figure 14:
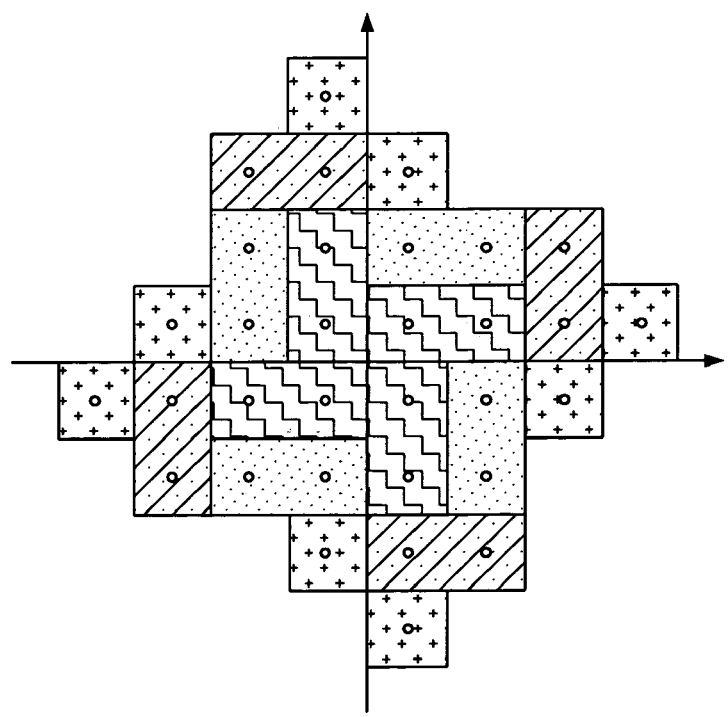
FIG. 14 illustrates a 32 point constellation with spherical shaping regions, designed for trellis precoding and that is compatible with rate-1/2 code.

When using non-square constellations, some adaptation is most preferably done to the TH precoder 600 since using the standard precoder will result in constellation expansion according to the square of minimum side that bounds all constellation points; and thus, a "negative" shaping gain. Introducing dependency between the real and imaginary parts of the signal points in the precoder 600 results in unnecessary complexity. A "rotated square constellation" such as the one illustrated in FIG. 14 (for 32 point constellations), as well as modulus arithmetic on the diagonals (i.e. real+image and real−image) are most preferably employed. In this way, trellis preceding can be implemented using both square and spherical regions. FIG. 14 illustrates a 32 point constellation with spherical shaping regions, designed for trellis preceding and that is compatible with rate-1/2 code.

In summary explanation, trellis preceding may be used to combine trellis shaping and precoding and can be combined with TTCM. Some performance degradation is generally caused in comparison to trellis shaping without preceding (especially for the case of difficult channels) due to the use of a reduced complexity decoder (PDFD); whereas some extra complexity is introduced in the transmitter due to the implementation of a precoder in each state of the VA. Importantly, a shaping gain of almost 1 dB may still be achieved. The low complexity of the receiver is left unchanged. Special constellations are most preferably employed for scenarios that use an odd number of transmitted bits per 2D symbol.

Figure 7:
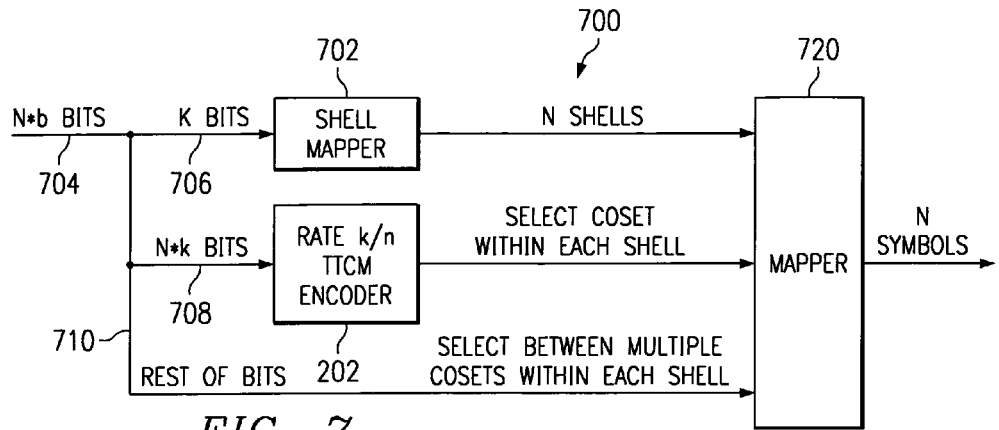
FIG. 7 is a simplified block diagram illustrating a transmitter using TTCM combined with shell mapping according to one embodiment of the present invention.

FIG. 7 is a simplified block diagram illustrating a transmitter 700 using TTCM combined with shell mapping 702 to implement a binary coded modulation system according to one embodiment of the present invention. Notations are described in detail herein below. The input bit stream 704 is divided into blocks of N*b bits each, resulting in N consecutive 2D symbols. Each block is divided into three parts. The first part 706 consisting of K bits is used to select N shells using shell mapping. The second part 708 consisting of N*k bits is passed through the encoder 202 of the TTCM, resulting in N cosets. One method that can be used to select a constellation point in each of the 2D symbols includes 1) selecting the shells according to the output of the shell mapper 720, 2) selecting the coset within the shell according to the output of the TTCM encoder 202, and 3) selecting between multiple cosets in each of the shells (if there is more than one coset in a shell) using the rest of the bits 710 in the block.

Figure 8:
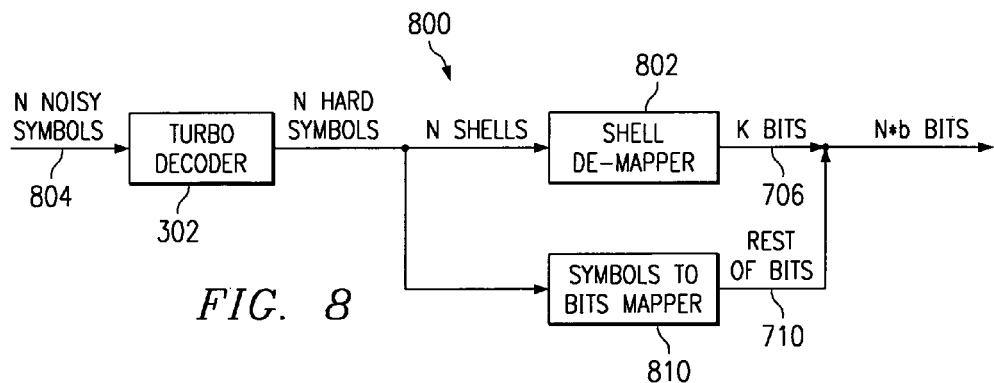
FIG. 8 is a simplified block diagram illustrating a receiver using TTCM combined with shell mapping according to one embodiment of the present invention.

FIG. 8 is a simplified block diagram illustrating a receiver 800 using a TTCM 302 combined with shell de-mapping 802 to produce hard decisions based on the noisy symbols received, according to one embodiment of the present invention. For each block of N symbols 804, the original K bits 706 are produced by the shell de-mapper 802; whereas the rest of the bits 710 are produced by the symbols to bits mapper 810. When no errors occur, the original N*b bits are recovered.

Figure 9:
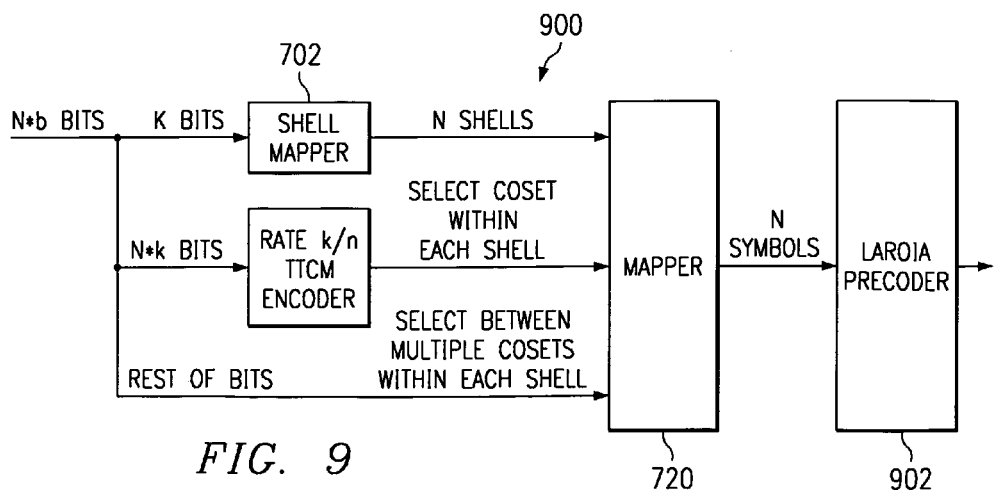
FIG. 9 is a simplified block diagram illustrating a transmitter using TTCM combined with shell mapping and Laroia precoding according to one embodiment of the present invention.

FIG. 9 is a simplified block diagram illustrating a transmitter 900 using TTCM combined with shell mapping 702 and Laroia precoding 902 according to one embodiment of the present invention.

Figure 10:
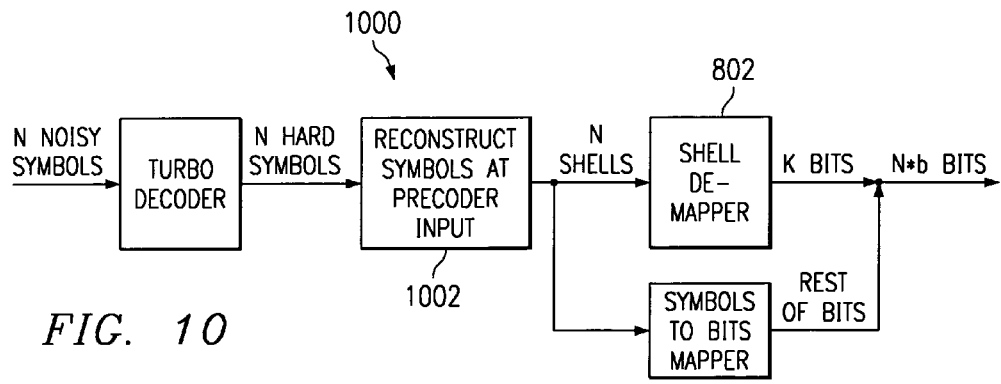
FIG. 10 is a simplified block diagram illustrating a receiver using TTCM combined with shell mapping and Laroia precoding according to one embodiment of the present invention.

FIG. 10 is a simplified block diagram illustrating a receiver 1000 using TTCM combined with shell de-mapping 802 and Laroia preceding according to one embodiment of the present invention.

Figure 11:
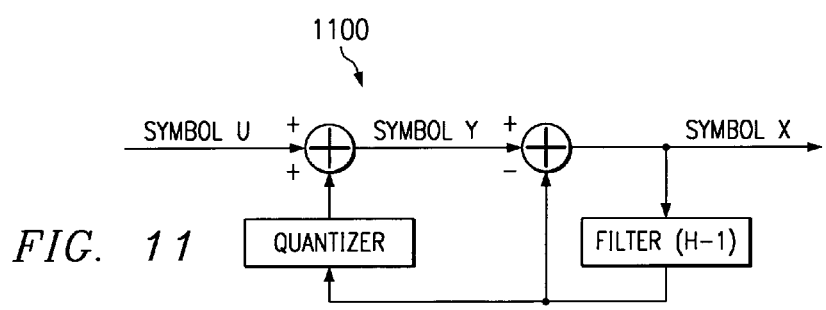
FIG. 11 is a simplified block diagram illustrating Laroia precoding.

FIG. 11 is a simplified block diagram illustrating a technique 1100 for implementing Laroia precoding according to one embodiment. The technique 900 is similar to the technique discussed herein before regarding shell mapping except that precoding 902 is now performed on the output symbols of the mapper 720 as seen in FIG. 9. In the receiver 1000, an additional step 1002 is required to reconstruct the symbols at the precoder input (symbol sequence U in FIG. 11), based on the product of the turbo decoder (which recovers the symbol sequence Y in FIG. 11). Once the symbols at the precoder input are recovered, similar mechanisms such as discussed herein before regarding shell mapping can be used to recover the original transmitted bits.

Shell mapping concepts as well as other related issues are now set forth in detail to further clarify and explain the particular embodiments presented herein above in order to provide those skilled in the arts of trellis coded modulation, turbo trellis coded modulation, constellation shaping and precoding, with the information needed to apply the novel principles and to construct and use such specialized components as are required. In 2N-dimensional shell mapping, each 2D constellation is divided into M shells. For every N symbols, the $M^N$ possible shell combinations are sorted from the lowest-power combination to the highest power combination. K bits enter a shell mapper that implements a one-to-one map between the $2^k$ possible bit combinations and the $2^k << M^N$ lowest power shell combinations. A precoding scheme that de-couples shaping and preceding is described in *A simple and effective precoding scheme for noise whitening on intersymbol interference channels*, R. Laroia, S. A. Tretter, N. Farvardin, IEEE Trans. Commun., October 1993, incorporated by reference herein. This precoding scheme may suffer from error propagation in the receiver due to the implementation of an IIR in the receiver that reconstructs the original signal (although in the presence of channel coding, this may be done after the channel decoder).

In V.34, described in ITU-T Recommendation V.34, September 1994, incorporated by reference herein, 2N=16 dimensional shell mapping and preceding are implemented, and work together with TTCM. The present inventor employed this scheme to simulate shell mapping together with TTCM or TTCM using different constellations and shaping parameters with results shown in Table 3 below; wherein the complexity of shell mapping is similar in the transmitter and the receiver, and results from the storage of some vectors used by the shell mapper, and from the actual mapping procedure.

TABLE 3

| Data rate R information bits/symbol | Constellation Without → with shaping | Theoretical shaping gain [dB] | Actual shaping gain [dB] | Shaping parameters used K,M,L ** | Remarks |
| --- | --- | --- | --- | --- | --- |
| 3 | 8QAM → 12QAM | 0.67 | 1.18 | 8,3,12 | Compatible with rate-1/2 code |

TABLE 3-continued

| Data rate R information bits/symbol | Constellation Without → with shaping | Theoretical shaping gain [dB] | Actual shaping gain [dB] | Shaping parameters used K,M,L ** | Remarks |
|---|---|---|---|---|---|
| 3 | 8QAM → 16QAM | 0.70 | 1.21 | 8,4,16 | Compatible with rate-1/2 code |
| 4 | 16QAM → 24QAM | 0.84 | 0.56 | 16,6,24 | Compatible with rate-1/2 code |
| 4 | 16QAM → 28QAM | 0.85 | 0.56 | 16,7,28 | Compatible with rate-1/2 code |
| 5 | 32CR → 48QAM | 0.88 | | 0.60 | Compatible with rate-1/2 code |
| 5 | 32CR → 56QAM | 0.90 | 0.62 | 24,14,56 | Compatible with rate-1/2 code |
| 6 | 64QAM → 96QAM | 0.88 | 0.82 (0.71) * | 24,12,96 | Compatible with rate-1/2 code |
| 6 | 64QAM → 96QAM | 0.93 | 0.86 (0.75) * | 24,14,112 | Compatible with rate-1/2 code |
| 7 | 128QAM → 192QAM | 0.90 | 0.71 | 24,12,192 | Compatible with rate-1/2 code |
| 7 | 128QAM → 224QAM | 0.94 | 0.74 | 24,14,224 | Compatible with rate-1/2 code |
| 4 | 16QAM → 24QAM | 0.38 | 0.1 | 8,3,24 | Compatible with rate-2/3 code |
| 5 | 32CR → 48QAM | 0.73 | 0.45 | 16,6,48 | Compatible with rate-2/3 code |
| 5 | 32CR → 56QAM | 0.76 | 0.48 | 16,7,56 | Compatible with rate-2/3 code |
| 6 | 64QAM → 96QAM | 0.86 | 0.79 (0.68) * | 24,12,96 | Compatible with rate-2/3 code |
| 6 | 64QAM → 96QAM | 0.90 | 0.84 (0.73) * | 24,14,112 | Compatible with rate-2/3 code |
| 7 | 128QAM → 192QAM | 0.91 | 0.72 | 24,12,192 | Compatible with rate-2/3 code |
| 7 | 128QAM → 224QAM | 0.94 | 0.76 | 24,14,224 | Compatible with rate-2/3 code |

The single * means that actual shaping gain was calculated relative to a square constellation. Using a trivial 2D "constellation shaping" (i.e. using a circle constellation rather than a square) yield the relative shaping gain shown in parentheses. The double ** means that K is the number of bits that enter the shell mapper for every block of eight 2D symbols (16D symbols). The letter M is the number of shells per 2D constellation and L is the enlarged 2D constellation size. The ratio L/M gives the number of 2D constellation points per shell. For rate-1/2 codes, this should be a multiple of 4, and for rate-2/3 codes, this should be a multiple of 8 (necessary but not sufficient requirements. For compatibility with a code based on constellation partitioning, there should be in each shell the same number of points from every subset. Looking at the results in Table 3, a 0.3 dB degradation in shaping gain can be seen when trying to transmit 4 bits/symbol compatible with a rate-2/3 code. This seems to occur due to the "large" shells in comparison to the constellation, whereas symbols within the shells are uniformly distributed.

Other related issues concern peak-to-average ratio (PAR), constellation expansion ratio (CER), other dimensionalities and multi-dimensional (MD) shaping schemes, among other things. Desired constraints on the PAR and CER are easily met by appropriately choosing the shell mapping parameters (constellation size, number of shells). *On optimal shaping of multidimensional constellations*, R. Laroia, N. Farvardin, S. A Tretter, IEEE Trans. Inf., Vol. 40, July 1994, incorporated by reference herein, notes that in general, for a given PAR and CER, no other shaping scheme results in a higher shaping gain and smaller delay than shell mapping. As stated above, the present inventor used a 16D shell mapping as described in the V.34 recommendation referenced herein before, but in combination with TTCM. This results in a shaping gain of almost 1 dB with a "shaping delay" of eight 2D symbols, also described herein before. The reference cited immediately above demonstrates achievable shaping gains, CER and PAR for different dimensionalities. It can be appreciated that using other dimensionalities will of course affect the algorithm complexity. Those skilled in the art will also appreciate that multi-dimensional shaping schemes may also be implemented, although this was not investigated by the present inventor.

In summation, 16D shell mapping may achieve a shaping gain of almost 1 dB in addition to other schemes, and may run smoothly together with them. It can be combined with TTCM as described above. Specifically TTCM of rate-1/2 and of rate-2/3 has been tested. The complexity is mainly due to storage which is similar in the transmitter and receiver, whereas the computational complexity is lower in the receiver.

Table 4 below illustrates a comparison of the trellis shaping/precoding and shell mapping schemes discussed in detail herein above.

TABLE 4

| Criterion | Trellis shaping | Shell mapping | Remarks |
| --- | --- | --- | --- |
| Shaping gain | Approaching 1 dB | Approaching 1 dB | In Tables 1 and 3, trellis shaping is slightly superior due to the higher CER (except for 4-bits/sym rate-2/3 code) |
| Complexity in transmitter | 4-state, 4-transition VA | Relatively high storage complexity, medium computational complexity | Shell mapping superior |
| Complexity in receiver | Very low | Relatively high storage complexity, low computational complexity | Trellis shaping superior |
| Delay in transmitter | About 20 symbols for sufficient performance | 8 symbol blocks | Shell mapping superior |
| Delay in receiver | No delay | 8 symbol blocks | Trellis shaping superior |
| PAR and CER constraints | May be introduced in VA, affects complexity | Inherent to algorithm | Shell mapping superior |
| Combination with code (e.g. TTCM) | Possible (rate-1/2 and rate-2/3) | Possible (rate-1/2 and rate-2/3) | Equivalent |
| Combination with precoding | Trellis precoding-higher complexity (transmitter), no error propagation Laroia precoding-introduces error propagation | Laroia precoding- introduces error propagation | When error propagation disastrous-trellis precoding superior |

Since shaping tries to reduce the transmitted energy, it results in larger use of constellation symbols with small energy, relative to symbols with high energy. It can be shown that the asymptotic distribution of the symbols for high dimensional shaping approaches Gaussian distribution. This fact slightly reduces the performance of the proposed combined scheme, especially for small constellations. This happens because the outer symbols (those with large energy) have better probability of error than the inner symbols. If they are transmitted with lower probability, the total probability of error is enlarged.

This degradation (which is usually less than 0.5 dB) can be improved by using the non-equi probable symbol distribution in the TTCM decoder. The decoder computes, in each iteration, the likelihood ratio for each data bit, which equals the ratio between the probability that this bit is '1' and the probability that this bit is '0'. If one prepares a table of the probability distribution of the data symbols, this table can be used in the calculations of these probabilities. Such a table can be prepared by simulating the transmitter and generating a histogram for the symbol distribution over a long period of time. This method can reduce the degradation by 0.2–0.3 dB.

In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, although various embodiments have been presented herein with reference to particular shell mapping/de-mapping elements and associated characteristics, the present inventive structures and methods are not necessarily limited to such a particular architecture or set of characteristics as used herein.

What is claimed is:

1. A method of binary coded data communication comprising:
   providing a transmitter having a turbo trellis coded modulator (TTCM) encoder and constellation shaping elements;
   dividing a desired symbol sequence into a first part having K-bits, a second part having N*k-bits, and a third part having the remaining bits;
   processing the first part of the desired symbol sequence via a shell mapper to generate N shells;
   processing the second part of the desired symbol sequence via the TTCM encoder to generate N cosets;
   mapping the third part of the desired symbol sequence, the N shells, and the N cosets to generate N transmit symbols, wherein N, K, and k are integers;
   providing a receiver having a receiver turbo decoder and receiver constellation shaping elements; and
   using the receiver turbo decoder and the receiver constellation shaping elements to process the N transmit symbols to recover the desired symbol sequence wherein the step of
   processing the N transmit symbols comprises the steps of:
   decoding the N transmit symbols via the turbo receiver decoder to generate N hard symbols,
   de-mapping the N hard symbols into the first part of the desired symbol sequence via a shell de-mapper,
   mapping the N hard symbols into the remaining part of the desired symbol sequence via a symbols to bits mapper, and
   combining the first part of the desired symbol sequence recovered by the shell de-mapper with the remaining part of the desired symbol sequence recovered by the symbols to bits mapper to recover the desired symbol sequence at the receiver.

2. The method according to claim 1, wherein the step of processing the N transmit symbols via the receiver turbo decoder and the receiver constellation shaping elements to recover the desired symbol sequence comprises processing the N transmit symbols via the receiver turbo decoder using a non equi-probable symbol distribution.

3. The method of binary coded data communication according to claim 1 further comprising the step of processing the N transmit symbols via a Laroia precoder to generate a precoded symbol sequence.

4. The method according to claim 3 wherein the step of processing the precoded symbol sequence via the receiver turbo decoder and the receiver constellation shaping elements to recover the desired symbol sequence comprises processing the precoded symbol sequence via the turbo decoder using a non equi-probable symbol distribution.

5. The method of binary coded data communication according to claim 3 wherein the step of processing the coded symbol sequence comprises the steps of:
  decoding the precoded symbol sequence via the turbo decoder to generate the N hard symbols;
  processing the N hard symbols to reconstruct symbols by the Laroia precoder input;
  de-mapping the reconstructed symbols into the first part of the desired symbol sequence via the shell de-mapper;
  mapping the reconstructed symbols into the remaining part of the desired symbol sequence via the symbols to bits mapper; and
  combining the first part of the desired symbol sequence recovered by the shell de-mapper with the remaining part of the desired symbol sequence recovered by the symbols to bits mapper to recover the desired symbol sequence at the receiver.

6. A method of processing incoming signals in a receiver comprising:
  receiving a sequence of N symbols;
  using a receiver turbo decoder and a receiver constellation shaping elements to process the N transmit symbols to recover the desired symbol sequence wherein the step of processing the N symbols comprises the steps of:
    decoding the N transmit symbols via the reciever turbo decoder to generate N hard symbols;
    de-mapping the N hard symbols into a first part of the desired symbol sequence via a shell de-mapper;
    mapping the N hard symbols into the remaining part of the desired symbol sequence via a symbols to bits mapper, and
    combining the first part of the desired symbol sequence recovered by the shell de-mapper with the remaining part of the desired symbol sequence recovered by the symbols to bits mapper to recover the desired symbol sequence.

7. A method according to claim 6, wherein the step of processing the N symbols via the receiver turbo decoder and the receiver constellation shaping elements to recover the desired symbol sequence comprises processing the N symbols via the receiver turbo decoder using a non equi-probable symbol distribution.

8. A method according to claim 6, wherein the sequence of N symbols is received from a transmitter having a transmitter turbo trellis coded modulator (TTCM) encoder and transmitter constellation shaping elements and the sequence of N symbols is generated by:
  dividing the desired symbol sequence into a first part having K-bits, a second part having N*k-bits, and a third part having the remaining bits;
  processing the first part of the desired symbol sequence via a shell mapper to generate N shells;
  processing the second part of the desired symbol sequence via the transmitter TTCM encoder to generate N cosets; and
  mapping the third part of the desired symbol sequence, the N shells, and the N cosets to generate the sequence of N symbols, wherein N, K, and k are integers.

9. A method according to claim 8, further comprising:
  processing the N symbols at the transmitter via a Laroia precoder to generate a precoded sequence of N symbols.

10. A method according to claim 9, wherein the sequence of N symbols received by the receiver is the precoded sequence of N symbols, the receiver turbo decoder decodes the precoded sequence of N symbols to generate the N hard symbols, and the N hard symbols are processed to reconstruct symbols by the Laroja precoder input.

11. A binary coded data communication system comprising:
  a transmitter having a turbo trellis coded modulator (TTCM) encoder and constellation shaping elements; and
  a receiver having a receiver turbo decoder and a receiver constellation shaping elements, wherein the receiver is configured to:
    receive a sequence of N symbols from the transmitter;
    using the turbo receiver decoder and the receiver constellation shaping elements to process the N transmit symbols to recover desired symbol sequence by:
      decoding the N transmit symbols via the turbo receiver decoder to generate N hard symbols;
      de-mapping the N hard symbols into a first part of the desired symbol sequence via a shell de-mapper;
      mapping the N hard symbols into the remaining part of the desired symbol sequence via a symbols to bits mapper; and
      combining the first part of the desired symbol sequence recovered by the shell de-mapper with the remaining part of the desired symbol sequence recovered by the symbols to bits mapper to recover the desired symbol sequence.

12. A system according to claim 11 wherein the TTCM encoder is configured to generate a rate $k_c/n_c$ TTCM code in response to a $k_c$-tuple part of the desired symbol sequence, and the constellation shaping elements of the transmitter comprise:
  a coset representative generator configured to generate a rate $k_s/n_s$ convolutional shaping code, where $k_s=n_s-r_s$, in response to a $r_s$-tuple part of the desired symbol sequence;
  a shaping code decoder configured to generate a desired bit sequence in response to an uncoded binary $n_u$-tuple part of the desired symbol sequence, the rate $k_c/n_c$ TTCM code, and the rate $k_s/n_s$ convolutional shaping code.

13. A system according to claim 12 wherein the turbo receiver decoder employs a non equi-probable symbol distribution.

14. A system according to claim 12 wherein the constellation shaping elements comprise trellis shaping elements.

15. A system according to claim 14, the constellation shaping elements of the transmitter further comprise:
  a combinational element configured to generate a transmit symbol sequence in response to the desired bit sequence and the rate $k_s/n_s$ convolutional shaping code; and
  a mapper configured to generate a plurality of signal points in response to the transmit symbol sequence, the uncoded binary $n_u$-tuple part of the desired symbol sequence, and the generated rate $k_c/n_c$ TTCM code, wherein $k_c$, $n_c$, $n_u$, $r_s$, $k_s$, and $n_s$ are integers.

16. A system according to claim 15 wherein the receiver turbo decoder is configured to receive the plurality of signal points via a transmission medium and generate estimated signal points therefrom, and further wherein the receiver constellation shaping elements comprise an inverse mapper configured to receive and process the estimated signal points to generate an estimated binary $k_c$-tuple part of the desired bit sequence according to the rate $k_c/n_c$ TTCM code, an estimated binary $n_u$-topic part of the desired symbol sequence, and an estimated binary $r_s$-tuple part of the desired bit sequence according to the rate $k_s/n_s$ convolutional shaping code.

17. A system according to claim 16 wherein the receiver constellation shaping elements further comprise a bit recovery element configured to process the estimated binary $k_c$-tuple part of the desired bit sequence according to the rate $k_c/n_c$ TTCM code such that k bits can be recovered based on n bits to generate an estimated binary $k_c$-tuple part of the desired symbol sequence.

18. A system according to claim 17 wherein the receiver constellation shaping elements further comprise a transformation element configured to process the estimated binary $r_s$-tuple part of the desired bit sequence according to the rate $k_s/n_s$ convolutional shaping code and therefrom generate an estimated syndrome $r_s$-tuple part of the desired symbol sequence.

19. A system according to claim 15 wherein the transmitter further comprises a trellis precoder operational to generate a coded symbol sequence in response to the plurality of signal points.

20. A system according to claim 19 wherein the receiver further comprises a folding element operational to generate a folded constellation in response to the coded symbol sequence.

21. A system according to claim 20 wherein the turbo decoder is configured to generate estimated signal points in response to the folded constellation, and the receiver constellation shaping elements further comprise an inverse mapper configured to generate an estimated binary $k_c$-tuple part of the desired bit sequence according to the rate $k_c/n_c$ TTCM code, an estimated uncoded binary $n_u$-tuple part of the desired symbol sequence, and an estimated binary $r_s$-tuple part of the desired bit sequence according to the rate $k_s/n_s$ convolutional shaping code in response to the estimated signal points.

22. A system according to claim 21 wherein the receiver constellation shaping elements further comprise a bit recovery element configured to process the estimated binary $k_c$-tuple part of the desired bit sequence according to the rate $k_c/n_c$ TTCM code such that k bits can be recovered based on n bits to generate an estimated binary $k_c$-tuple part of the desired symbol sequence.

23. A system according to claim 22 wherein the receiver constellation shaping elements further comprise a transformation element configured to process the estimated binary $r_s$-tuple part of the desired bit sequence according to the rate $k_s/n_c$ convolutional shaping code and therefrom generate an estimated syndrome $r_s$-tuple part of the desired symbol sequence.

24. A system according to claim 19 wherein the trellis precoder comprises a Tomlinson-Harashima precoder.

25. A system according to claim 11 wherein the constellation shaping elements comprise shell mapping elements.

26. A system according to claim 25 wherein TTCM encoder of the transmitter is configured to process the second part of the partitioned symbol sequence to generate N cosets.

27. A system according to claim 26 wherein the constellation shaping elements of the transmitter comprise:
  a shell mapper configured to process the first part of the partitioned symbol sequence to generate N shells; and
  a mapper configured to process the third part of the partitioned symbol sequence, the N shells, and the N cosets to generate N transmit symbols.

28. A system according to claim 27 wherein the receiver turbo decoder is configured to process the N symbols to generate N hard symbols and wherein the receiver constellation shaping elements comprise:
  a symbols-to-bits mapper configured to map the N hard symbols into the third part of the partitioned symbol sequence;
  a shell de-mapper configured to de-map the N hard symbols into the first part of the partitioned symbol sequence; and
  a combinational element configured to combine the first part of the partitioned symbol sequence recovered by the shell de-mapper with the third part of the partitioned symbol sequence recovered by the symbols-to-bits mapper to recover the partitioned symbol sequence at the receiver.

29. A system according to claim 27 wherein the transmitter further comprises a Laroia precoder operational to generate a precoded symbol sequence in response to the N signals.

30. A system according to claim 29 wherein the receiver turbo decoder is configured to process the coded symbol sequence to generate N hard symbols and wherein the receiver constellation shaping elements comprise:
  a symbol processor configured to process the N hard symbols to reconstruct symbols appearing at the Laroia precoder input;
  a shell de-mapper configured to de-map the reconstructed symbols into the first part of the desired symbol sequence;
  a symbols-to-bits mapper configured to map the reconstructed symbols into the remaining part of the desired symbol sequence; and
  a combinational element configured to combine the first part of the desired symbol sequence recovered by the shell de-mapper with the remaining part of the desired symbol sequence recovered by the symbols-to-bits mapper to recover the partitioned symbol sequence at the receiver.

* * * * *